United States Patent
Gomez

(10) Patent No.: US 6,667,914 B2
(45) Date of Patent: Dec. 23, 2003

(54) LOAD MODULATION DEVICE IN A REMOTELY POWERED INTEGRATION CIRCUIT

(75) Inventor: Bertrand Gomez, Roquevaire (FR)

(73) Assignees: STMicroelectronics SA, Montrouge (FR); Gemplus, Gemenos (FR)

( * ) Notice: Subject to any disclaimer, the term of this patent is extended or adjusted under 35 U.S.C. 154(b) by 105 days.

(21) Appl. No.: 10/009,101

(22) PCT Filed: Apr. 2, 2001

(86) PCT No.: PCT/FR01/00983

§ 371 (c)(1),
(2), (4) Date: Mar. 12, 2002

(87) PCT Pub. No.: WO01/75784

PCT Pub. Date: Oct. 11, 2001

(65) Prior Publication Data

US 2003/0021158 A1 Jan. 30, 2003

(30) Foreign Application Priority Data

Apr. 5, 2000 (FR) .............................................. 00 04355

(51) Int. Cl.[7] ................................................. G11C 7/00
(52) U.S. Cl. ............................. 365/189.09; 365/185.27; 365/226
(58) Field of Search ........................... 365/226, 189.09, 365/185.27; 340/870.31, 825.3; 331/57, 143

(56) References Cited

U.S. PATENT DOCUMENTS

| 5,345,231 A | * | 9/1994 | Koo et al. ............. 340/870.31 |
| 5,491,456 A | * | 2/1996 | Kay et al. ...................... 331/57 |
| 6,529,127 B2 | * | 3/2003 | Townsend et al. .......... 340/505 |

* cited by examiner

Primary Examiner—Son T. Dinh
(74) Attorney, Agent, or Firm—Lisa K. Jorgenson; Allen, Dyer, Doppelt, Milbrath & Gilchrist, P.A.

(57) ABSTRACT

A load modulation device in a remotely powered integrated circuit includes an oscillating circuit, and a voltage device for regenerating first and second power supply voltages. The voltage device includes at least one MOS transistor in a well on at least one terminal of the oscillating circuit. The at least MOS transistor includes a source or drain connected to the at least one terminal. A bias circuit biases the well to the first or second power supply voltage based upon a modulation signal.

39 Claims, 3 Drawing Sheets

LOAD MODULATION DEVICE IN A REMOTELY POWERED INTEGRATION CIRCUIT

FIELD OF THE INVENTION

The present invention relates to a load modulation device in a remotely powered integrated circuit. Such a device provides data transmission between the remotely powered integrated circuit and a reader, and provides a source of an electromagnetic field by causing an equivalent load of the integrated circuit to vary, as seen from the reader. This invention is notably applied to contactless chip cards and to electronic labels or tags.

BACKGROUND OF THE INVENTION

In such applications, an oscillating circuit of the LC type, for example, is used for regenerating the power supply and transmitting data between the card and the reader. The oscillating circuit may be partly or totally integrated into the integrated circuit or may be externally offset.

The oscillating circuit placed in an electromagnetic field delivers at its terminals an alternating signal with the same frequency as the signal emitted by the reader. The amplitude of this voltage signal is maximum when the resonant frequency of the oscillating circuit is equal to the emission frequency of the reader.

An integrated circuit for such applications usually comprises a circuit for rectifying the alternating signal provided by the oscillating circuit. The function of the rectifier circuit is to connect this alternating voltage to a continuous load for matching the load of the logic circuits of the integrated circuit. In other words, this rectifier circuit converts the power supply alternating voltage into a DC voltage for powering the logic circuitry of the integrated circuit.

The load modulation causing the impedance of the tuning circuit, as seen from the reader, to vary according to the data to be transmitted. The integrated circuit comprises for this purpose a load modulation circuit, controlled by a modulation logic signal delivered by a data transmission stage of the integrated circuit. The load modulation circuit generally includes one or more transistors connected between the output pads of the oscillating circuit, and is controlled by the modulation logic signal.

FIG. 1 illustrates a first exemplary embodiment of a load modulation circuit in a remotely power integrated circuit. This integrated circuit comprises conventionally, an oscillating circuit 1 which delivers an alternating voltage signal between its terminals A and B, and a rectifier circuit 2 for, rectifying this alternating voltage signal to provide DC power supply voltages Vdd and Gnd to the logic circuitry 3 of the integrated circuit. In the example, the rectifier circuit 2 is provided with a diode bridge D0, D1, D2, D3 and the logic circuitry 3 is illustrated by its equivalent load, with a resistor Re and a capacitor Ce parallel-connected between supply voltages Vdd and Gnd.

The load modulation circuit 4 of the oscillating circuit 1 is controlled by a modulation binary signal, marked as mod, and is delivered by a data transmission stage ED in the logic circuitry 3, not shown.

The load modulation circuit 4 comprises a switching transistor Tm1 controlled by the modulation signal mod on its gate. In the example, this is an N-type MOS transistor connected between a modulation node Nm and the power supply voltage Gnd. The load modulation circuit 4 further comprises two insulation transistors, one per terminal of the oscillating circuit, which protect the switching transistor Tm1 against voltages that are too high. There is an insulation transistor Ti1 connected between the terminal A and the node Nm, and an insulation transistor Ti2 connected between terminal B and node Nm. In the example, both of these are N-type MOS transistors. Each one is mounted as a diode with its gate and drain connected together.

When the switching transistor Tm1 is driven by the modulation binary signal mod into the off or blocked state, it is equivalent to a high value resistor which is marked as rdsoff. When the switching transistor is driven into the on or conducting state, it is equivalent to a low value resistor which is marked as rdson. The difference between resistors rdsoff and rdson generates the load variation. The operating angular pulsation of the oscillating circuit 1 remains unchanged.

FIG. 2 illustrates another exemplary embodiment of the load modulation circuit 4. In this example, the load modulation circuit comprises a capacitor Cm and a switching transistor Tm2 connected in series between terminals A and B. In the example, the switching transistor is an N-type MOS transistor, and receives the modulation binary signal mod on its gate. According to the binary level of the signal mod, the switching transistor Tm2 connects capacitor Cm in parallel to the oscillating circuit 1. Depending on whether the capacitor Cm is actually connected in parallel, the capacitor load and the operating pulsation of the oscillating circuit 1 are changed.

These load modulation circuit examples are state of the art, and in common they require connection of extra components to the oscillating circuit 1, which interferes with the quality factor of this circuit. The quality factor is understood as the overvoltage at its terminals at the circuit's oscillation frequency. The current load due to extra components reduces the overvoltage, and therefore, the efficiency of the oscillating circuit 1.

In addition, extra components bring about a cost overrun in terms of implantation area on the integrated circuit. They should actually be able to withstand large voltage changes on the terminals of the oscillating circuit, which may attain 10 to 100 volts.

SUMMARY OF THE INVENTION

In view of the foregoing background, an object of the invention is to provide a load modulation device in a remotely powered circuit which does not have the above described drawbacks.

This and other objects, advantages and features are provided by using the parasitic drain/substrate diode or source/substrate diode of MOS transistors that are implemented in a well. According to the invention, by applying the modulation to the well of a MOS transistor that is connected through its drain or its source to a terminal of the oscillating circuit, the parasitic drain/well diode or source/well diode may become conductive. This has the effect of pulling the considered terminal up to a given voltage level, which amounts to modifying the load of the oscillating circuit, as seen from the reader.

As characterized, the invention therefore relates to a load modulation device in a remotely powered integrated circuit, and the device regenerates a first and a second power supply voltage for the circuit. The device comprises an oscillating circuit and at least one MOS transistor produced in a well, on at least one terminal of the oscillating circuit. The drain or the source of the at least one transistor is connected to the at least one terminal.

The invention is further characterized in that the modulation device comprises means or a circuit for biasing the well to the first or the second power supply voltage according to the level of a modulation binary signal.

BRIEF DESCRIPTION OF THE DRAWINGS

Other features or advantages of the invention are detailed in the following description of the invention, made in an indicative and non-limiting way, and with reference to the appended drawings wherein.

DETAILED DESCRIPTION OF THE PREFERRED EMBODIMENTS

Figure 6:
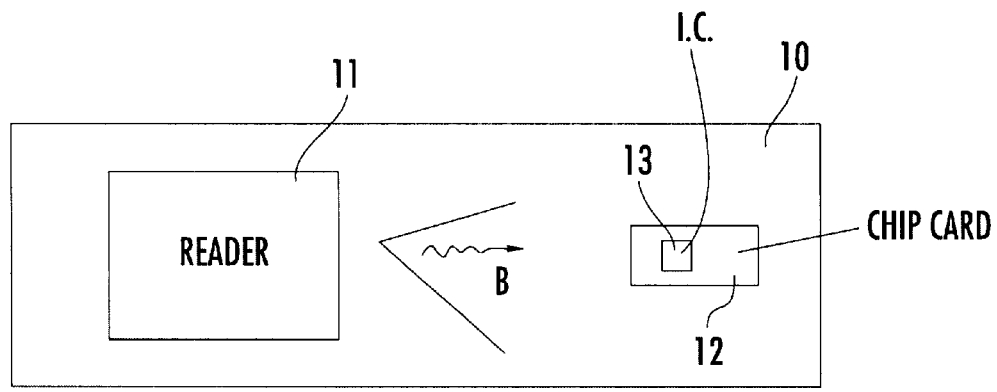
FIG. 6 illustrates an electronic system using a remotely powered integrated circuit according to the invention.

In the figures, the same components have the same references. As illustrated in FIG. 6, an electronic system 10 for application to a chip card, electronic label or tags comprises a reader 11 providing (i.e., the remote power supply for chip cards or electronic labels 12) an electromagnetic field B. These chip cards or electronic labels 12 comprise an integrated circuit 13 of the remotely powered type.

Figure 3:
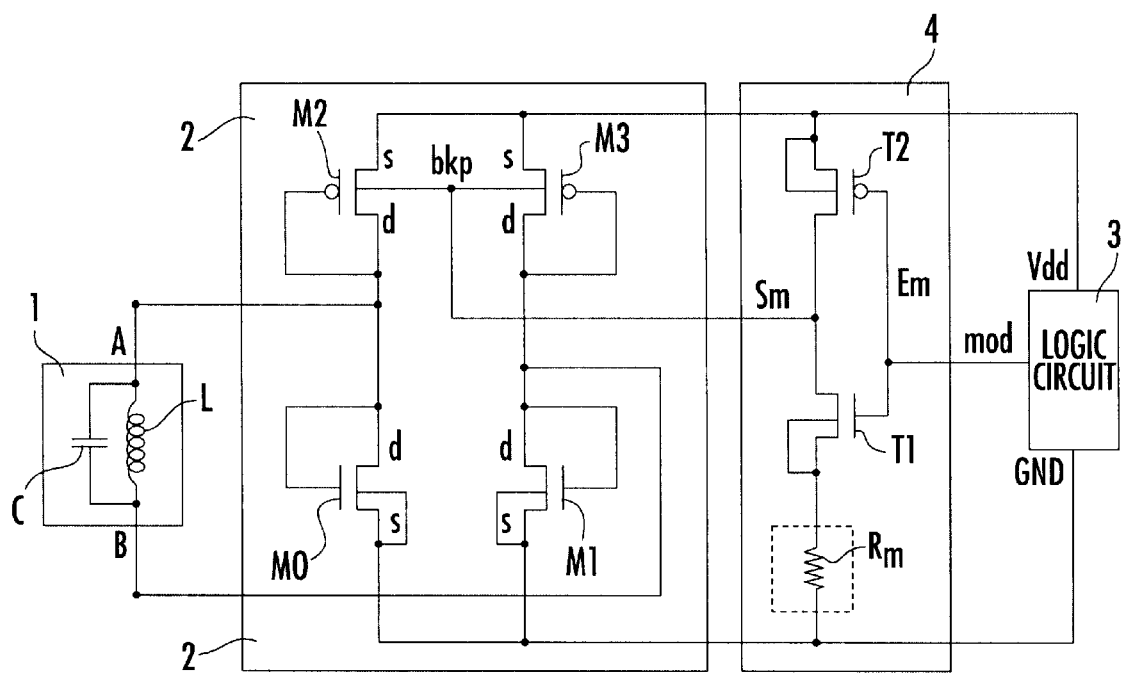
FIG. 3 illustrates a remotely powered integrated circuit comprising a load modulation circuit according to a first exemplary embodiment of the invention.

The remotely powered integrated circuit 13 illustrated in FIG. 3 comprises, as in the previous figures, a device for power supply regeneration comprising an oscillating circuit 1 and a rectifier circuit 2, electronic circuitry 3 powered by the regenerated power supply voltages Vdd and Gnd, and a load modulation circuit 4 of the oscillating circuit.

Figure 1:
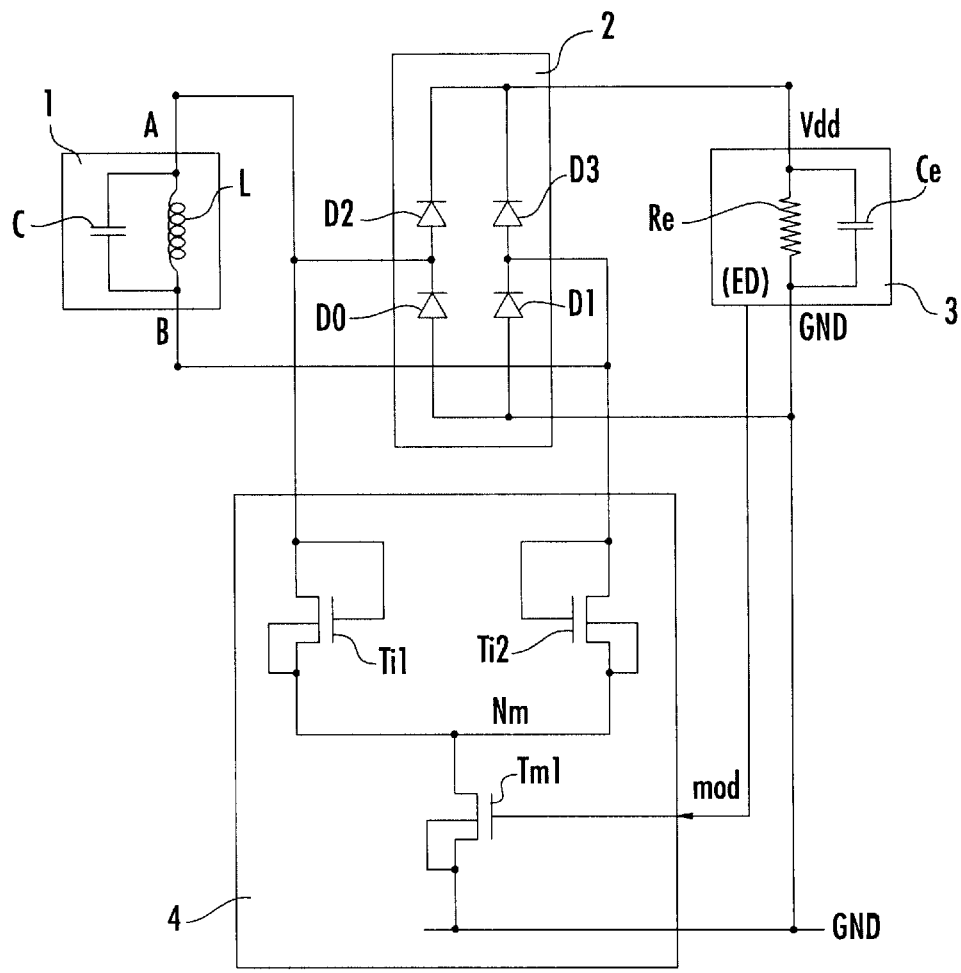
FIGS. 1 and 2 each illustrate a remotely powered integrated circuit comprising a load modulation circuit according to the prior art.
Figure 2:
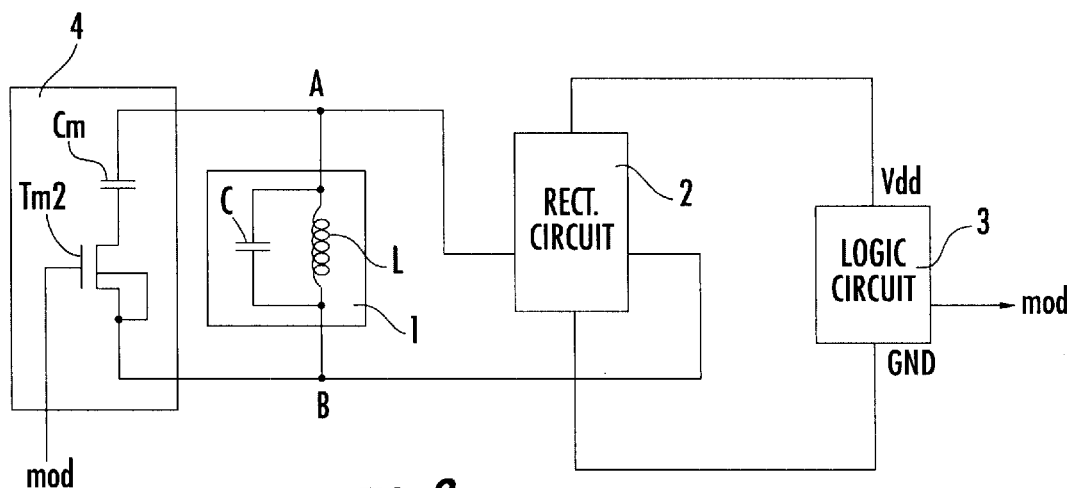

In the example, the rectifier circuit 2 has a diode bridge structure matching the structure D0, D1, D2, D3 illustrated in FIG. 1. In FIG. 3, these diodes are each produced by a MOS transistor configured as a diode, with its gate and drain connected together.

More specifically, diode D0 is produced by an N-type MOS transistor M1, the source s of which is connected to the power supply voltage Gnd and the gate g and drain d are connected together to terminal A. Also, diode D1 is produced by an N-type MOS transistor M1, the source s of which is connected to the power supply voltage Gnd and the gate g and drain d are connected together to terminal B. Diode D2 is produced by a P-type MOS transistor M2, the source s of which is connected to the power supply voltage Vdd and the gate g and drain d are connected together to terminal A. Diode D3 is produced by a P-type MOS transistor M3, the source s of which is connected to the power supply voltage Vdd and the gate g and drain d are connected together to terminal B.

Usually, the substrate or the well of a transistor is biased to a suitable voltage, generally to the source voltage, to prevent the parasitic diodes drain/substrate or drain/well and source/substrate or source/well from conducting, so that leaks may be avoided in the transistor. This bias is embodied in the figures by a "bulk" bias connection, between the channel of the transistor and its source.

In an example of MOS technology on a P substrate, the NMOS transistors are made in the P substrate and the PMOS transistors are made in N wells. It is possible to have a different bias for each well, according to needs, while the bias of the substrate is the same for the whole integrated circuit.

In the invention, the bias of the well is used to maintain the parasitic diode of the well of a MOS transistor connected to a terminal of the oscillating circuit 1 in the non-conducting state or to cause it to conduct. In this way, if the drain of this transistor is connected to a terminal of the oscillating circuit 1, this terminal may be pulled up to the well bias voltage which causes the associated parasitic diode to conduct. The equivalent load of the oscillating circuit 1 is thus changed, as seen from the reader.

If the example illustrated in FIG. 3 is considered, using MOS technology on a P substrate, P MOS transistors M2 and M3 are produced in a well, preferably in the same well. The drain of each of these transistors is connected to a terminal of the oscillating circuit 1.

The load modulation circuit 4 according to the invention then comprises means driven by a modulation binary signal mod for changing the well bias voltage of these transistors M2 and M3. In the example, these means include an inverter comprising a PMOS transistor T2 and an NMOS transistor T1 connected between the power supply voltages Vdd and Gnd. The gates of which are connected together and receive the modulation binary signal mod, and the drains of which are connected together and provide the output S of the inverter, which is connected to the well bias connection bkp.

If the modulation binary signal is a 1, it is the transistor T1 of the load modulation circuit 4 which is conducting. The output S is pulled down to the power supply voltage Gnd. Thus, according to the level of the alternating signal on terminals A and B of the oscillating circuit 1, at least one parasitic drain/well diode is conducting, pulling the associated terminal to the power supply voltage Gnd.

If the modulation binary signal is a 0, it is the transistor T2 of the load modulation circuit 4 which is conducting. Output S is pulled up to the power supply voltage Vdd. The well of transistors M2 and M3 is then biased to the power supply voltage Vdd and no drain/well diode is conducting. Transistor T1 is dimensioned to pull down the well bias connection to the power supply voltage Gnd, more or less rapidly, according to the desired modulation index.

In an alternative embodiment illustrated in FIG. 3, a resistive component Rm is provided in series between the transistor T1 and the power supply voltage Gnd, which also provides for matching the modulation index of the circuit 4. This resistive component Rm may be produced by a pure resistor (diffusion, polysilicon, for example) or by an equivalent circuit, for example, a transistor circuit.

Figure 4:
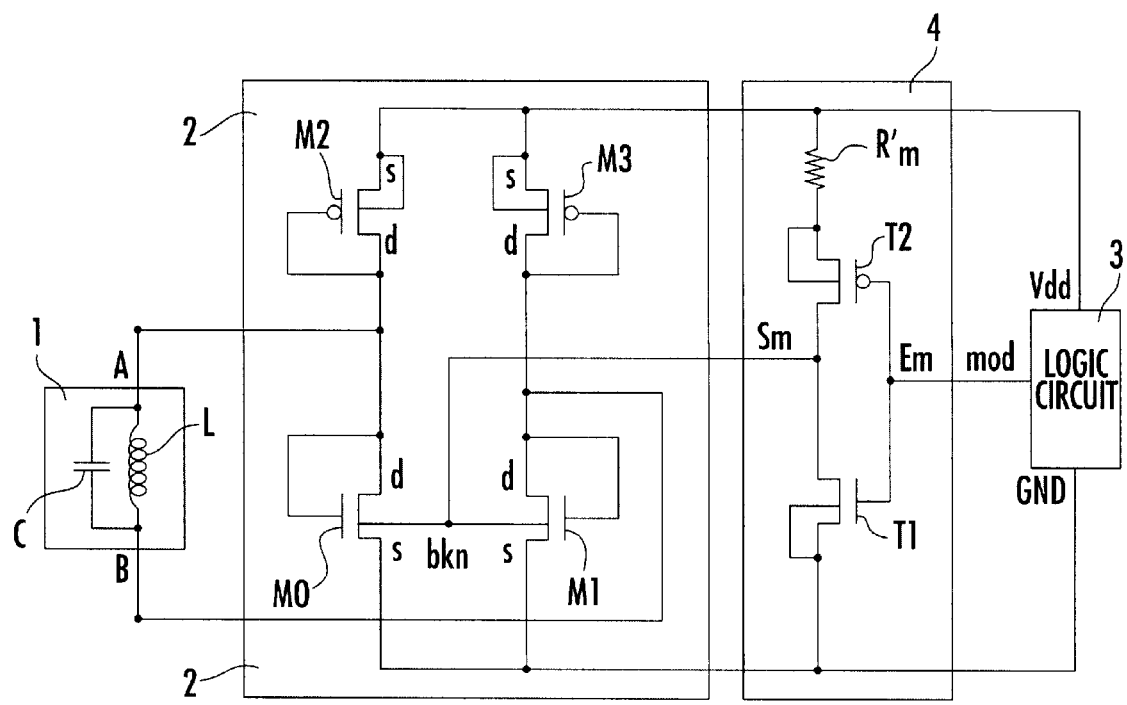
FIG. 4 illustrates an alternative of the load modulation circuit illustrated in FIG. 3.

In FIG. 4, a dual solution of the one illustrated in FIG. 3 is shown, which corresponds to an integrated circuit produced on an N-type substrate. In this example, the NMOS transistors are produced in P-type wells. These wells are normally biased at the power supply voltage Gnd, typically by their source. The load modulation circuit 4 according to the invention then enables either the well of transistors M0 and M1 to be normally biased to the power supply voltage Gnd, or to be biased to the power supply voltage Vdd according to the modulation binary signal mod.

In this example, the output S of the load modulation circuit is connected to the well bias connection bkn of transistors M0 and M1. If it comprises a matching resistor Rm' for the modulation index, this resistor is then provided between the power supply voltage Vdd and transistor T2, in order to raise the output S of the circuit to the power supply voltage Vdd, more or less rapidly.

Another example of a remotely powered integrated circuit with a load modulation circuit according to the invention is illustrated in FIG. 4. The difference with the solution illustrated in FIG. 3 lies in that the MOS transistors of the rectifier circuit 2 are mounted differently. In this example, transistors M0 and M2 form a first inverter, with their gates connected together on terminal A and their drains connected together on terminal B. Transistors M1 and M3 form another inverter with their gates connected together on terminal B and their drains connected together on terminal A. A rectifier structure is obtained with inverters with input/output feedback on terminals A and B of the oscillating circuit 1 for regenerating power supply voltages Vdd and Gnd.

In this example, the load modulation circuit 4 according to the invention is applied in the same way as in FIG. 3. For transistors M2 and M3, produced in N wells, the well bias connection is connected to the output of the load modulation circuit 4, which has the same structure as in FIG. 3.

The invention may also be applied to configurations of the device for regenerating power supply voltages Vdd and Gnd, wherein there would be a transistor produced in a well connected through its source to a terminal of the oscillating circuit 1. In this well, it is the well source diode which allows the modulation according to the invention to be applied.

It will also be noted that the load modulation circuit 4 according to the invention preferably comprises at least one well transistor per terminal of the oscillating circuit. However, it may include a well transistor on only one terminal even if the efficiency of the load modulation circuit 4 is lower in this well.

More generally, as on at least one terminal of the oscillating circuit 1, at least one MOS transistor produced in a well has its drain or source connected to the relevant terminal. A load modulation circuit 4 according to the invention may be provided to change the well bias voltage according to the modulation binary signal mod.

Figure 5:
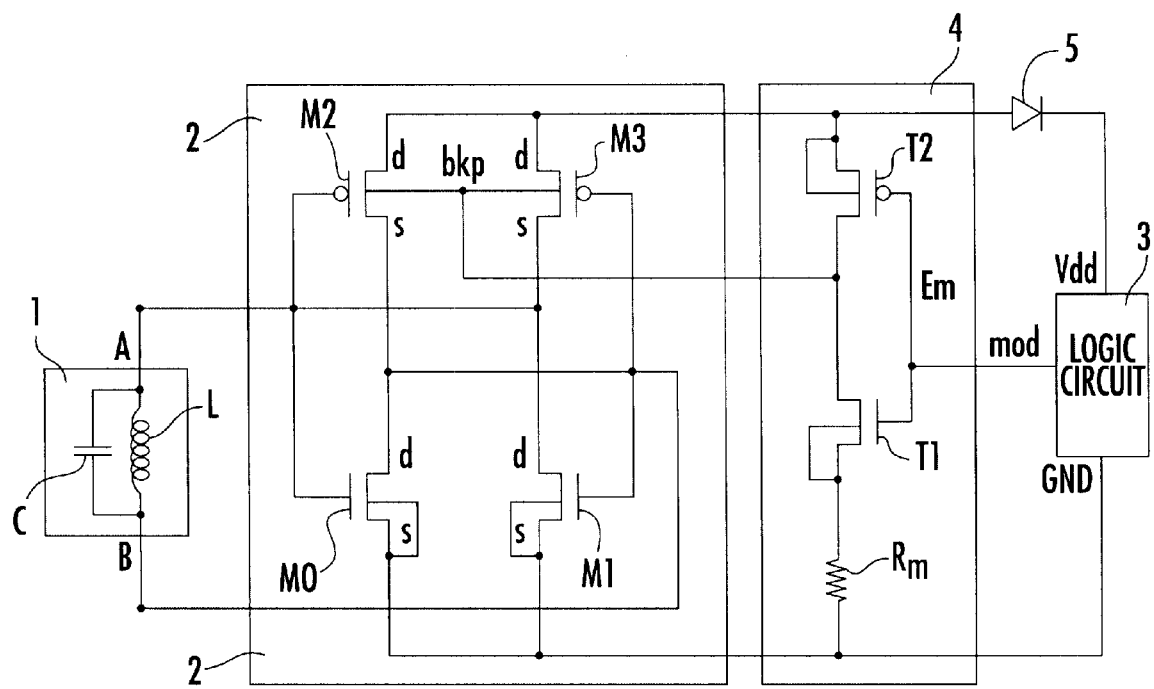
FIG. 5 illustrates a remotely powered integrated circuit comprising a load modulation circuit according to another exemplary embodiment of the invention.

It will be noted that it is not very important whether the MOS transistors M2 and M3 of FIGS. 3 and 5 are each produced in a separate or in a same well. The same remark applies to transistors M0 and M1 of FIG. 4.

The load modulation device 4 according to the invention is particularly straightforward to implement and does not add any load onto the oscillating circuit 1. Thus, the quality factor of the oscillating circuit 1 is the same with or without modulation. In addition, the load modulation circuit 4 does not have to withstand large voltage differences which may occur on the terminals of the oscillating circuits. It is therefore of smaller dimensions, resulting in substantial savings in silicon surface area for the integrated circuit.

If, as illustrated in FIGS. 3–5, the integrated circuit comprises an insulating device 5 connected between the power supply output Vdd of the rectifier circuit 2 and the matching input on the internal circuits 3, the load modulation circuit 4 will be placed upstream between the rectifier circuit 2 and the insulating device 5.

What is claimed is:

1. A load modulation device in a remotely powered integrated circuit and comprising:
   an oscillating circuit;
   a regeneration circuit connected to said oscillating circuit for regenerating first and second power supply voltages and comprising a well and at least one MOS transistor formed therein; and
   a bias circuit for biasing the well to the first or second power supply voltage based upon a modulation signal.

2. A load modulation device according to claim 1, wherein the modulation signal is a binary modulation signal.

3. A load modulation device according to claim 1, wherein the remotely powered integrated circuit comprises an electronic circuit that is powered by the first and second power supply voltages.

4. A load modulation device according to claim 1, wherein said at least one MOS transistor comprises a plurality of MOS transistors; and wherein the well has a same type of conductivity as said plurality of MOS transistors.

5. A load modulation device according to claim 1, wherein said oscillating circuit comprises a pair of terminals; and wherein said regeneration circuit comprises a voltage rectifier connected between the pair of terminals and provides at an output thereof the first and second power supply voltages.

6. A load modulation device according to claim 1, wherein the remotely powered integrated circuit comprises a data transmission stage for providing the modulation signal; wherein said biasing circuit comprises an inverter connected between the first and second power supply voltages; and wherein said inverter comprises an input for receiving the modulation signal and an output connected to the well.

7. A load modulation device according to claim 6, wherein said at least one MOS transistor has associated therewith a parasitic diode; and wherein said inverter comprises:
   a first transistor for pulling the output up to the first power supply voltage for blocking the parasitic diode; and
   a second transistor for pulling the output down to the second power supply voltage for causing the parasitic diode to conduct.

8. A load modulation device according to claim 7, wherein said biasing circuit further comprises a resistive component connected between said second transistor and the second power supply voltage.

9. A load modulation device according to claim 8, wherein dimensions of said second transistor are based upon a desired modulation index; and wherein said resistive component has a resistivity based upon the desired modulation index.

10. A remotely powered integrated circuit comprising:
    an oscillating circuit;
    a regeneration circuit connected to said oscillating circuit for regenerating first and second power supply voltages and comprising a well and at least one MOS transistor formed therein;
    a bias circuit for biasing the well to the first or second power supply voltage based upon a modulation signal; and
    an electronic circuit that is powered by the first and second power supply voltages, and provides the modulation signal.

11. A remotely powered integrated circuit according to claim 10, wherein the modulation signal is a binary modulation signal.

12. A remotely powered integrated circuit according to claim 10, wherein said at least one MOS transistor comprises a plurality of MOS transistors; and wherein the well has a same type of conductivity as said plurality of MOS transistors.

13. A remotely powered integrated circuit according to claim 10, wherein said oscillating circuit comprises a pair of terminals; and wherein said regeneration circuit comprises a voltage rectifier connected between the pair of terminals and provides at an output thereof the first and second power supply voltages.

14. A remotely powered integrated circuit according to claim 10, wherein said biasing circuit comprises an inverter connected between the first and second power supply voltages; and wherein said inverter comprises an input for receiving the modulation signal and an output connected to the well.

15. A remotely powered integrated circuit according to claim 14, wherein said at least one MOS transistor has associated therewith a parasitic diode; and wherein said inverter comprises:
   a first transistor for pulling the output up to the first power supply voltage for blocking the parasitic diode; and
   a second transistor for pulling the output down to the second power supply voltage for causing the parasitic diode to conduct.

16. A remotely powered integrated circuit according to claim 15, wherein said biasing circuit further comprises a resistive component connected between said second transistor and the second power supply voltage.

17. A remotely powered integrated circuit according to claim 16, wherein dimensions of said second transistor are based upon a desired modulation index; and wherein said resistive component has a resistivity based upon the desired modulation index.

18. A chip card comprising:
   a substrate;
   a remotely powered integrated circuit on said substrate and comprising
      an oscillating circuit,
      a regeneration circuit connected to said oscillating circuit for regenerating first and second power supply voltages and comprising a well and at least one MOS transistor formed therein, and
      a bias circuit for biasing the well to the first or second power supply voltage based upon a modulation signal.

19. A chip card according to claim 18, wherein the modulation signal is a binary modulation signal.

20. A chip card according to claim 18, wherein said remotely powered integrated circuit comprises an electronic circuit that is powered by the first and second power supply voltages.

21. A chip card according to claim 18, wherein said at least one MOS transistor comprises a plurality of MOS transistors; and wherein the well has a same type of conductivity as said plurality of MOS transistors.

22. A chip card according to claim 18, wherein said oscillating circuit comprises a pair of terminals; and wherein said regeneration circuit comprises a voltage rectifier connected between the pair of terminals and provides at an output thereof the first and second power supply voltages.

23. A chip card according to claim 18, wherein said remotely powered integrated circuit comprises a data transmission stage for providing the modulation signal; wherein said biasing circuit comprises an inverter connected between the first and second power supply voltages; and wherein said inverter comprises an input for receiving the modulation signal and an output connected to the well.

24. A chip card according to claim 23, wherein said at least one MOS transistor has associated therewith a parasitic diode; and wherein said inverter comprises:
   a first transistor for pulling the output up to the first power supply voltage for blocking the parasitic diode; and
   a second transistor for pulling the output down to the second power supply voltage for causing the parasitic diode to conduct.

25. A chip card according to claim 24, wherein said biasing circuit further comprises a resistive component connected between said second transistor and the second power supply voltage.

26. A chip card according to claim 25, wherein dimensions of said second transistor are based upon a desired modulation index; and wherein said resistive component has a resistivity based upon the desired modulation index.

27. An electronic system comprising:
   a reader for providing an electromagnetic field; and
   a chip card comprising a substrate, and an integrated circuit on said substrate and being remotely powered by the electromagnetic field, said integrated circuit comprising
      an oscillating circuit,
      a regeneration circuit connected to said oscillating circuit for regenerating first and second power supply voltages and comprising a well and at least one MOS transistor formed therein, and
      a bias circuit for biasing the well to the first or second power supply voltage based upon a modulation signal.

28. An electronic system according to claim 27, wherein the modulation signal is a binary modulation signal.

29. An electronic system according to claim 27, wherein said remotely powered integrated circuit comprises an electronic circuit that is powered by the first and second power supply voltages.

30. An electronic system according to claim 27, wherein said at least one MOS transistor comprises a plurality of MOS transistors; and wherein the well has a same type of conductivity as said plurality of MOS transistors.

31. An electronic system according to claim 27, wherein said oscillating circuit comprises a pair of terminals; and wherein said regeneration circuit comprises a voltage rectifier connected between the pair of terminals and provides at an output thereof the first and second power supply voltages.

32. An electronic system according to claim 27, wherein said integrated circuit further comprises a data transmission stage for providing the modulation signal; wherein said biasing circuit comprises an inverter connected between the first and second power supply voltages; and wherein said inverter comprises an input for receiving the modulation signal and an output connected to the well.

33. An electronic system according to claim 32, wherein said at least one MOS transistor has associated therewith a parasitic diode; and wherein said inverter comprises:
   a first transistor for pulling the output up to the first power supply voltage for blocking the parasitic diode; and
   a second transistor for pulling the output down to the second power supply voltage for causing the parasitic diode to conduct.

34. An electronic system according to claim 33, wherein said biasing circuit further comprises a resistive component connected between said second transistor and the second power supply voltage.

35. A method for remotely powering an integrated circuit, the method comprising:
   receiving electromagnetic energy via an oscillating circuit;
   regenerating first and second power supply voltages based upon the electromagnetic energy using a regeneration circuit comprising a well and at least one MOS transistor formed therein; and
   biasing the well to the first or second power supply voltage based upon a modulation signal.

36. A method according to claim 35, wherein the at least one MOS transistor comprises a plurality of MOS transistors; and wherein the well has a same type of conductivity as the plurality of transistors.

37. A method according to claim 35, wherein the oscillating circuit comprises a pair of terminals; and wherein the regeneration circuit comprises a voltage rectifier connected between the pair of terminals and provides at an output thereof the first and second power supply voltages.

38. A method according to claim 35, wherein the integrated circuit comprises a data transmission stage for providing the modulation signal; and wherein the biasing is provided using a biasing circuit comprising an inverter connected between the first and second power supply voltages; and wherein the inverter comprises an input for receiving the modulation signal and an output connected to the well.

39. A method according to claim 38, wherein the at least one MOS transistor has associated therewith a parasitic diode; and wherein the inverter comprises:

a first transistor for pulling the output up to the first power supply voltage for blocking the parasitic diode; and a second transistor for pulling the output down to the second power supply voltage for causing the parasitic diode to conduct.

\* \* \* \* \*

UNITED STATES PATENT AND TRADEMARK OFFICE
CERTIFICATE OF CORRECTION

PATENT NO. : 6,667,914 B2
DATED : December 23, 2003
INVENTOR(S) : Bertrand Gomez It is certified that error appears in the above-identified patent and that said Letters Patent is hereby corrected as shown below:

<u>Title page, Item [54] and Column 1, line 2,</u>
Title, delete "POWERED INTEGRATION" insert -- POWERED INTEGRATED --

Signed and Sealed this

Fourth Day of May, 2004

JON W. DUDAS
*Acting Director of the United States Patent and Trademark Office*